(12) United States Patent
Mueller et al.

(10) Patent No.: US 8,554,867 B1
(45) Date of Patent: Oct. 8, 2013

(54) EFFICIENT DATA ACCESS IN CLUSTERED STORAGE SYSTEM

(75) Inventors: Garrett Mueller, Cary, NC (US); Wesley Witte, Campbell, CA (US)

(73) Assignee: NetApp Inc., Sunnyvale, CA (US)

( * ) Notice: Subject to any disclaimer, the term of this patent is extended or adjusted under 35 U.S.C. 154(b) by 234 days.

(21) Appl. No.: 12/694,626

(22) Filed: Jan. 27, 2010

(51) Int. Cl.
*G06F 15/167* (2006.01)

(52) U.S. Cl.
USPC ............ 709/213; 709/203; 709/216; 709/217

(58) Field of Classification Search
USPC .................................. 709/203, 213, 216, 217
See application file for complete search history.

(56) References Cited

U.S. PATENT DOCUMENTS

| | | | |
|---|---|---|---|
| 6,826,613 B1 * | 11/2004 | Wang et al. | 709/227 |
| 2005/0262246 A1 * | 11/2005 | Menon et al. | 709/226 |

* cited by examiner

*Primary Examiner* — Yves Dalencourt
(74) *Attorney, Agent, or Firm* — Cooper Legal Group LLC

(57) ABSTRACT

Methods and/or systems for efficiently handling a request from a client for a target component (e.g., file) stored on a remote or secondary node in a clustered storage system are provided. In response to a request from the client for the target component, a first node to which the client is locally connected retrieves a list of one or more logical interfaces (LIFs) and generates a response comprising an indication that the requested target component is not covered by this first node and a list of one or more internet protocol (IP) addresses that correspond to the retrieved LIFs for accessing the secondary node. This allows the client to connect locally to the secondary node so that the target component can be retrieved locally and thus more efficiently regardless of where (e.g., upon which node) the file is stored within the cluster.

20 Claims, 8 Drawing Sheets

EFFICIENT DATA ACCESS IN CLUSTERED STORAGE SYSTEM

FIELD

The present disclosure relates to distributed data storage environments and, more specifically to efficient connection to data in a distributed data storage environment.

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented.

When linking remote (or even locally dispersed) locations that require access to stored data, and/or to promote the continued availability of such data in the event of hardware, software, or even site failures (e.g., power outages, sabotage, natural disasters), entities have developed clustered networks that link disparate storage mediums to a plurality of clients, for example. Typically, to access data, one or more clients can connect to respective nodes of a clustered storage environment, where the nodes are linked by a cluster fabric that provides communication between the disparate nodes. Nodes can be dispersed locally, such as in a same geographical location, and/or dispersed over great distances, such as around the country.

As data storage requirements and/or management needs of a data management and storage networks increase, such as for an enterprise, for example, nodes can be added to the system. Further, enterprises that have branch/remote office often utilize a centralize storage system, remote from the branch offices. However, as more remote nodes are added to the system to accommodate storage requirements, for example, data access can be slowed.

Accessing data from a remote node takes longer (hence utilizing greater computing resources) than accessing data from the local node. For example, a client computer attempting to access data from a locally connected node will receive a response faster than if requesting the same data from a remote node. Accessing data on a remote node can be slower because it may require a network hop to the node, there may be latency and bandwidth constraints for the interconnect cluster network, etc., any and/or all of which can adversely impact data access.

Currently, techniques and/or systems utilize data reduction to accelerate transfer of data across a wide area network (WAN). For example, using data reduction, all data to and from a locally connected client is examined in real-time (e.g., as data requests and responses occur), prior to being sent across the WAN. All examined data is stored in a data storage device at the local node. Further, when duplicate information is detected, references are sent to the requesting node in the cluster instructing the node to deliver the information locally, for example, instead of resending it across the WAN.

Using the current technology, all of the data that is sent or received from or to a node in the cluster is examined and compared against the information stored at the local node. However, constantly comparing data against locally stored data can also lead to slowed performance and may necessitate greater computing resources.

SUMMARY

This disclosure relates to one or more techniques and/or systems that provide for improved speed and efficiency when accessing (e.g., read or write operations) data that resides on a remote node in a multi-node networked data storage system (e.g., cluster). Performance and speed of operations may be improved by connecting and accessing the data locally to the node in the cluster on which the target data resides, where the target data resides on a remote node. By identifying a node on which the data resides in the cluster and providing a local access point for the data to a client, the client can mitigate internal network hops by connecting locally to that node. In this way, latency associated with internal hops in the network can be mitigated when the path to the requested data is routed locally rather than remotely.

In one embodiment, for handling a request from a local client to a target component stored on a remote node, in response to the request the local node can retrieve a list of one or more logical interfaces (LIFs) for a remote node that comprises the target component. If LIFs are retrieved, the local node can generate a response that indicates that the requested target component is not covered by (e.g., not accessible from) the local node. Further, the response can comprise a list of one or more internet protocol (IP) addresses that correspond to the retrieved LIFs for accessing the remote node. In this way, in this embodiment, the client can connect (or be connected) to the remote node locally by using the one or more IP addresses in the response, thereby accessing the target component directly from the remote node, for example.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
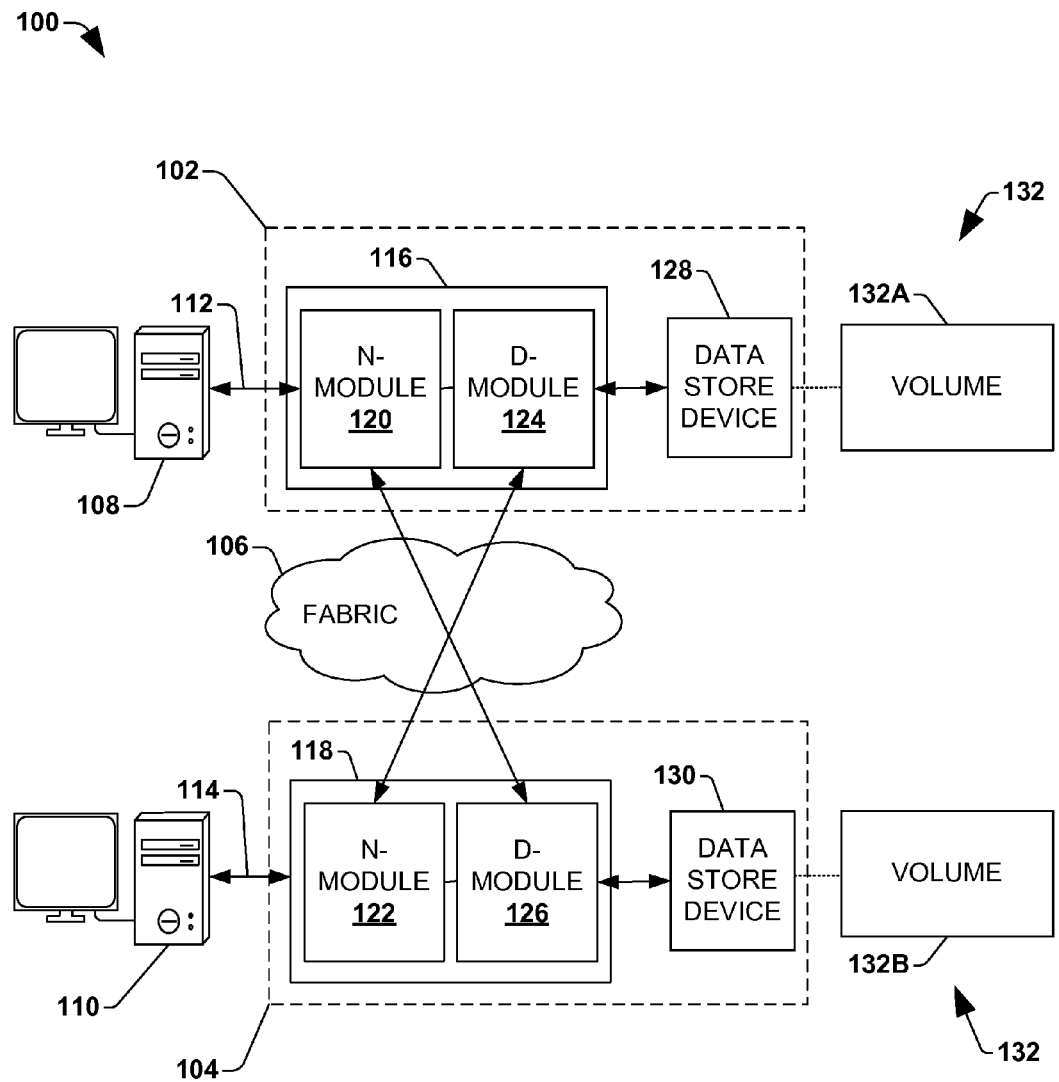
FIG. 1 is a component block diagram illustrating an example clustered network in accordance with one or more of the provisions set forth herein.

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

In a multi-node, clustered data storage and management network, data can be retrieved for a request, such as from a client connected to the network, via one of a plurality of nodes (e.g., comprising storage systems). Retrieving the data for the request can take longer if the data is located on a node that is remote from the location of the client's attachment (e.g., to a local node). To provide for efficient resource utilization and improved data response time, the present disclosure presents one or more methods and/or systems for identifying a location of requested information in the multi-node cluster using a structured directory, and providing a way for client to access the requested information as a local data request.

Figure 2:
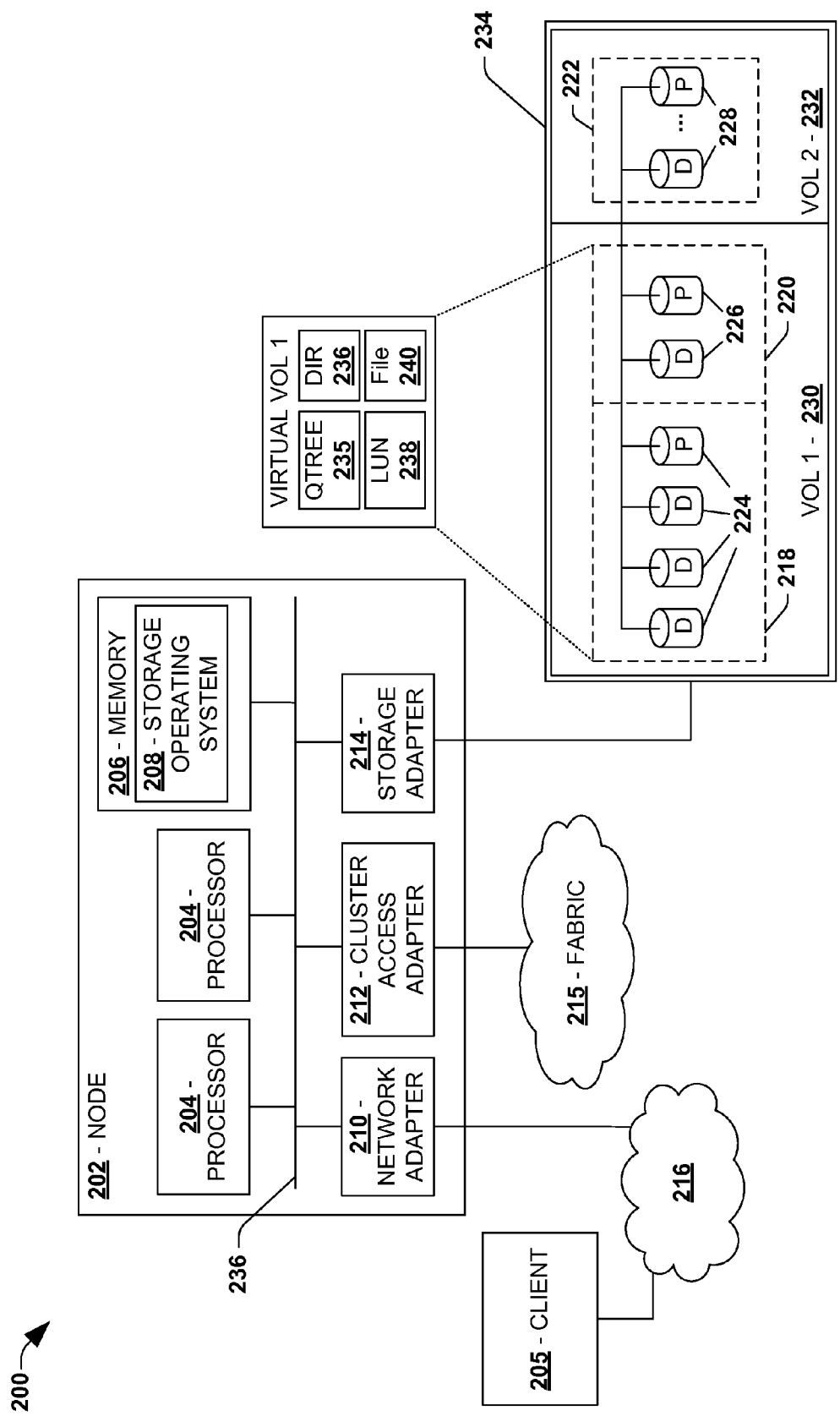
FIG. 2 is a component block diagram illustrating an example data storage system in accordance with one or more of the provisions set forth herein.

To provide a context for an embodiment of how clients may be directed to locally access requested information by identifying its location, FIG. 1 illustrates a clustered network environment 100, for example, whereon local and remote data storage volumes may reside, and FIG. 2 illustrates an embodiment of a data storage system that may be implemented to store and manage data in this clustered network environment. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

In one embodiment, as provided herein, when a client device (e.g., 108, 110) is connected to a particular node (e.g., 116, 118) within a cluster and requests data or a data file stored on a node within the cluster, the client device can be provided the file if the file is stored on the particular node to which the client device is connected. The client device will be redirected to a different node, however, upon which the requested file is stored if the file is not located on the node to which the client device is initially connected. In this manner, the file can be locally and thus more efficiently accessed by the client device from the node upon which the file is actually stored regardless of which node the client device is initially connected to.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to facilitate redirecting a client device to a particular node upon which a requested file is stored in the event that the requested file is not stored on the node to which the client is connected when the request is made.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 (e.g., vols. 132 in FIG. 1) that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238, may be characterized as constituting a virtual disk or drive upon which data within the virtual volume is stored within the aggregate. For example, LUNs are often referred to as virtual hard drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 224, 226 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 224 by using one or more addresses that identify the LUNs 238.

In one aspect, in a clustered network comprising a data storage and management environment, such as illustrated by the exemplary environment 100, data can be located at any node of the cluster. In this aspect, in one embodiment, when a client requests data, such as a read operation, from the clustered data storage and management system a location of the data can be identified, and a response comprising the requested data is sent back to the client, as described above. In this embodiment, for example, when the data is sent back to the client it travels a data path through the system, which may comprise segments that include the local node to which the client is connected, the cluster fabric, a remote node, the N-blade on the remote node, the D-blade on the remote node, the storage device on the remote node, the volume on the remote storage device, and the LUN on the remote volume where the data resides on a disk. In one embodiment of data access locating and local client accessing, access to the requested information may be accelerated if the client connects locally to the remote node that comprises the requested information, where the location and local connection is identified from a first request from the client to the local node.

It will be appreciated that while reference may be made herein to "local" (e.g., local node, local connection) and/or "remote" (e.g., remote node, remote connection), that these references are not intended to create particular limitations relative to associated components. For example, a client may initially connect to a first node of a cluster and then subsequently connect to a second node of the cluster. When the initial connection occurs, the first node may be regarded as the local node, the initial connection may be regarded as the local connection, and the second node may be regarded as a remote node. However, when the client subsequently establishes a direct connection to the second node, the second node may then be regarded as the local node, the subsequent connection may be regarded as the local connection and the first node may then be regarded as the remote node. That is to say, local and remote labels may be transient among components, and just because a component has a particular label at a particular point in time does not mean that it has to bear that label indefinitely. Rather, a first node in a cluster may be local to a client at a first point in time and then remote to the client at a second point in time, where a second node that was initially remote to the client at the first point in time may be local to the client at second point in time.

Figure 3:
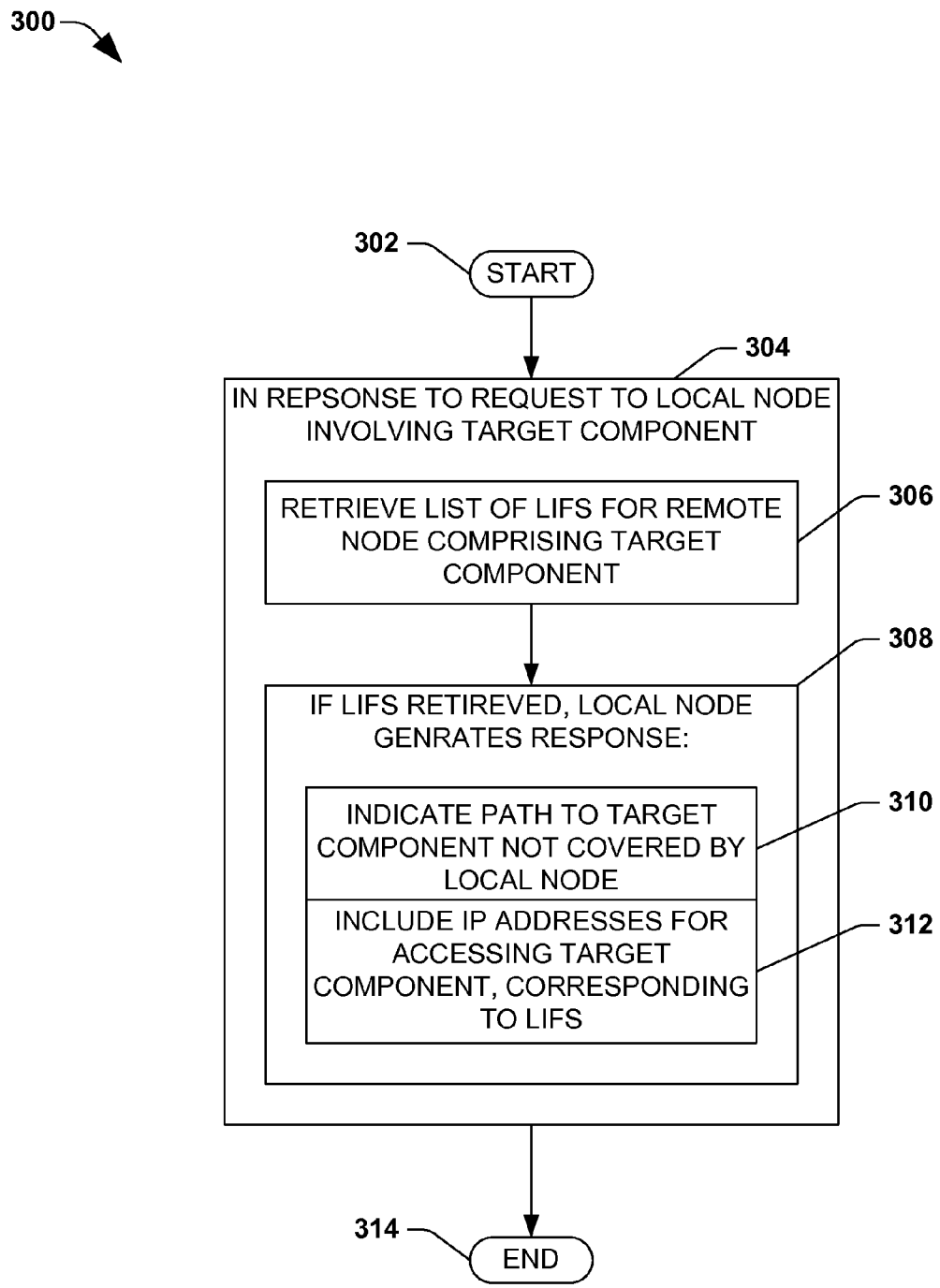
FIG. 3 is a flow diagram illustrating an example method for handling a request to a remote target component in accordance with one or more of the provisions set forth herein.

FIG. 3 is a flow diagram illustrating an example method 300 for handling a request to a remote target component. It will be appreciated that while this method 300 (as well as any other methods described herein) is illustrated and described as a series of acts or events, the present disclosure is not necessarily limited by the illustrated ordering of such acts or events. For example, some acts may occur in different orders and/or concurrently with other acts or events apart from those illustrated and/or described herein. In addition, not all illustrated acts may be required and other non-illustrated acts may be inserted. Further, one or more of the acts depicted herein may be carried out in one or more separate acts or phases.

The exemplary method 300 begins at 302 in response to a request for a target component being received on a local node of a distributed data storage network, at 304. For example, with reference to FIGS. 1 and 2, a client (e.g., 108, 110) can be connected locally (e.g., 112, 114) to a node (e.g., 116, 118). In this example, the client sends a request over the local connection to the local node, where the request comprises some target component, such as a text file for a read request, which is stored on the distributed data storage network (e.g., in a data storage device, such as 234).

At 306, the local node retrieves a list of one or more logical interfaces (LIFs) for a remote node that comprises the target component. In one embodiment, a LIF is a set of values that can be assigned to variable parameters of an interface (physical interface) for accessing a storage component in the distributed data storage network, thereby describing how an interface is be configured. A LIF is also commonly known as a virtual interface or a virtual network adapter. For example, with reference to FIGS. 1 and 2, the distributed data storage network can comprises various storage components, such as a data storage device (e.g., 234), and virtual volumes (e.g., 230, 232). In this example, the respective storage components can have a limited number of physical interfaces that allow access from other areas of the distributed data storage network, such as from a network module (e.g., 120, 122, 124, 126) or client (e.g., 108, 110). Further, respective physical interfaces can have a plurality of LIFs, for example, that provide different configurations for accessing the component, while emulating the physical interfaces for the component.

In one embodiment, the target component may be logically arranged on a virtual server, which is a logical representation of portions of one or more physical servers (e.g., a virtual representation of logically arranged partitions of data on a plurality of physical server). For example, two physical servers may comprise four virtual servers, each having portions of data from both physical servers. A physical server may comprise a plurality of virtual servers each having a different configuration and name presented to a client, for example.

In one embodiment, the LIFs can provide access points to the various virtual servers, for example, from different clients and nodes in the distributed data storage system, where a first LIF may provide access to the virtual server comprising the target component for a first client attached to a first node, and a second LIF may provide access to the virtual server comprising the target component for a second client attached to a second node. In this embodiment, a list of LIFs that provide access to the virtual server comprising the target component can be retrieved by the local node in response to the request for the target component on a local node.

At 308 of the exemplary method 300, the local node generates a response to the request if one or more LIFs are retrieved. That is, for example, the response is generated if at least one LIF is retrieved for accessing the target component on the remote node, such as through a virtual server on the remote node, by connecting a client locally to the remote node.

The response comprises an indication that a path to the target component is not covered (e.g., not accessible from, or no access provided) by the local node, at 310, such as an error message indicating that the request cannot be fulfilled by the local node. For example, even though the local node may be able to access the target component on the remote node (e.g., by connecting remotely to the remote node through the network fabric, such as shown in FIG. 1), the retrieval of the LIF may indicate that a more efficient retrieval path exists for accessing the target component. In this embodiment, the response indicates that the target component is not accessible by the local node, for example, thereby forcing the client to find another access point.

A more efficient path, for example, can be one where the client directly connects to the controller that comprises the requested data, such as client 110 in FIG. 1 directly connecting to the controller of the data storage systems 104 comprising the data storage device 130, on which the requested data is stored. It will be appreciated, that in other embodiments, a more efficient path may merely describe a path that has fewer hops (e.g., between nodes in the distributed data storage system, such as 100 of FIG. 1) so that data travels more quickly to the client from a retrieval point. In another embodiment, more efficient may describe a faster data path, such that data travels faster to the client from the retrieval point, for example, which typically occurs when a client connects directly to the node that comprises the requested data, as described above. In some instances, however a faster path does not necessarily have to be shorter path. For example, depending on differences on infrastructure, transmission speeds, switching speeds, etc., a (physically) longer path may actually be faster than a shorter path.

At 312, the response further comprises one or more internet protocol (IP) addresses for accessing an efficient path to the target component, where the IP addresses correspond to the retrieved one or more LIFs for the remote node. As an example, in order to make an interface accessible to the kernel networking layer, thereby making it available to other components on the network, an IP address and other parameters are assigned to respective LIFs prior to the request for the target component (e.g., when the distributed data storage network was configured). Therefore, in this embodiment, a list of the IP addresses assigned to the retrieved LIFs can be included in the response, for example, thereby providing the client with a local connection to the target component on the remote node to provide a more efficient data retrieval path.

Having generated a response to the request, for example, comprising alternate and more efficient connection paths to the target component, the exemplary method 300 ends at 314.

Figure 4:
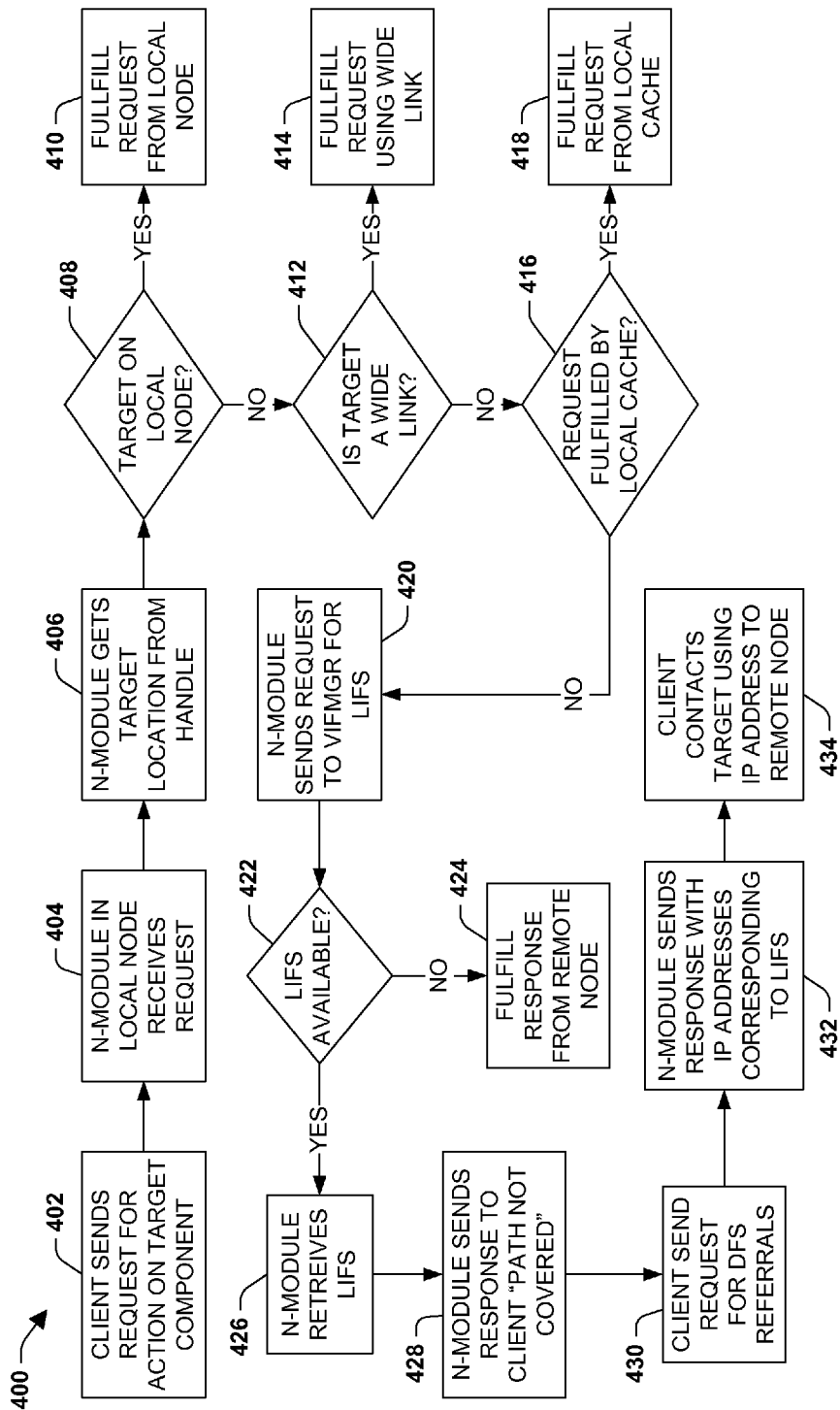
FIG. 4 is a flow diagram illustrating one embodiment of a method for handling a request to a remote target component in accordance with one or more of the provisions set forth herein.

FIG. 4 is a flow diagram illustrating an example embodiment 400 of implementing one or more of the techniques described herein. At 402, the client (e.g., 108 in FIG. 1) sends a request for some action on a target component, such as a read operation on a test file stored in the distributed data storage network. At 404 the network module (e.g., N-Module 120, FIG. 1) in the local node (e.g., node 116 is local to the client 108 in FIG. 1) receives the request. At 406, the N-Module gets the target component's location in the distributed data storage network from a handle associated with the request.

In one embodiment, a distributed data storage network (e.g., cluster) can utilize handles, such as identifiers, attached to file requests that identify a location of the requested file in the cluster. Therefore, for example, when a requests comes into a local node, the node can look at the handle to determine whether the file is stored locally (e.g., on the data storage device, such as 128 of FIG. 1, attached to the local node), or remotely (e.g., on a remote data storage device 130, attached to a remote node 114, of FIG. 1) in the cluster.

In one embodiment, a distributed file system (DFS) namespace can be utilized to identify locations of target components. A DFS namespace is a layer over a cluster of common internet file system (CIFS) servers that provides clients with an ability to access data on any server in the cluster, regardless of which server they are connected to, for example. The DFS allows clients to merely go to one location on the network to access files, even though the files may be physically spread across multiple servers (physical or virtual CIFS servers). As an example, a client can connect to a DFS namespace group (e.g., that emulates a CIFS server) that is really a redirect point to connect to the actual CIFS server comprising the data requested by the client. The DFS namespace provides a directory structure that can be built to arrange and manage storage of data in a clustered environment.

In this embodiment, the DFS namespace can be built automatically (e.g., programmatically) based on the cluster configuration, thereby allowing nodes in the cluster to identify where files are located using the handles. Therefore, for example, when the N-Module receives a request, it can identify of the target component of the request is located locally or remotely based on the handle. At 408, in the example embodiment 400, the N-Module identifies whether the target component is on the local node. If it is stored locally (YES), the request can be fulfilled from the local node, at 410. If the target component is not stored locally (NO), the N-Module determines whether the target component is a wide link, at 412.

As an example, the N-Module can comprise one or more components that are configured to identify a location of requested data by metadata associated with the request. In one embodiment, an internode interface, resident in the N-Module, can examine the request and determine a location of the requested data in the cluster based on metadata attached to the request string, for example. It will be appreciated, however, that one or more of the techniques and/or systems, described herein, are not limited to any particular embodiment for location identification, as those skilled in the art may devise alternate techniques and/or components that can perform this function. In one embodiment, the component used to identify the location of the requested data may compare the metadata against a list of node identifiers, such as stored in a local database (e.g., 206 of FIG. 2), in order to identify if the data is stored locally or remotely, for example.

A wide link, as an example, can be a manually created DFS link (e.g., in a directory) for the namespace that redirects to another location in a directory (e.g., another CIFS server). That is, in this example, when traversing a data path through a directory, when the wide link is reached it redirects to another directory in the DFS namespace. If the target component is a wide link (YES at 412), the request is fulfilled using the wide link, at 414. If the target component is not a wide link (NO at 412), the N-Module determines whether the request can be fulfilled by a local cache, at 416.

In one embodiment, the local node may comprise a local cache that can be used to store data stored in the cluster (e.g., on a remote node) that is commonly accessed locally. In this way, in this embodiment, the commonly accessed data can be retrieved more quickly by the local node, instead of having to retrieve it from a remote location in the cluster. If the target component can be accessed in the local cache (YES at 416), the request is fulfilled from the local cache of the local node, at 418. If the request cannot be fulfilled by the local cache (NO at 416), the N-Module sends a request to a virtual interface manager (VIM) for any LIFs associated with the target component, at 420.

As described above, the target component can reside on a remote node in the cluster, in a virtual server and/or virtual volume, for example. In one embodiment, where the target component is logically stored in a virtual server, accessed from a remote node (e.g., the data storage device 130 of remote node 118, FIG. 1), the virtual server can be accessed by one or more LIFs corresponding to access points in the cluster. Further, the cluster may utilize a VIM, which is an application that can be used to manage the LIFs for the cluster. That is, in user space (e.g., accessible to users of a client attached to the cluster), the VIM provides information and management tools to a user (and the cluster) for the LIFs associated with the virtual servers comprised in the cluster. In this way, for example, the VIM can provide a list of LIFs for a particular virtual server of interest to the N-Module, where the target component resides. As described above, the LIFs can comprise alternate access points to the virtual server (e.g., alternate to the local node, such as other remote nodes in the cluster).

It will be appreciated that one or more of the techniques and/or systems described herein are not limited to any particular location for the VIM and/or LIF information. That is, for example, the VIM may reside on the local node, such as in the N-module (e.g., 120, 122 of FIG. 1). Further, in this example, the VIM can be stored in memory on the local node (e.g., 206 of FIG. 2), and executed by a processor located in the local node (e.g., 204 of FIG. 2). Additionally, the list of LIFs available for various storage components can be managed and stored by the VIM, such as in a local database. That is, for example, the VIM may store a list of LIFs for the cluster in a database stored locally, such as in memory of the local node (e.g., 204 of FIG. 2). In another embodiment, the database may be distributed over the cluster, such as by storing parts in local memories of the nodes in the cluster.

At 422, it is determined (e.g., by the VIM) whether there are LIFs available for the target component (e.g., other than the local node access). If there are no LIFs available (e.g., none returned by the VIM), at 424, the response can be fulfilled from the remote node (e.g., the target component is accessed by the local node from the remote node). If there are LIFs available (e.g., the VIM manager returns one or more LIFs), the N-Module retrieves the LIFs at 426. As an example, if the VIM manager provides LIFs for the request from the N-Module, it may be an indication that the virtual server comprising the target component can be accessed from the remote node, by connecting locally to the remote node (e.g., client 110 connecting to the remote node 118, for access to the target component stored on 130, of FIG. 1).

At 428, the N-Module sends a response to the client that the path to the target component is not covered (e.g., no access provided by) by the local node (e.g., the node the client is connected to). For example, an error message can be sent that the data cannot be retrieved or accessed locally. As described above, for example, this may force the client to look for alternate ways to access the target component, such as connecting to another node in the cluster. At 430, in response to the N-Module's "path not covered" response, the client sends a request to the local node for DFS referrals.

In one embodiment, when a client accesses a share (e.g., shared folder) in the DFS namespace, a referral is returned for the client to use to locate that share. In this embodiment, the referral comprises information that maps a DNS name in the logical namespace to a universal naming convention (UNC) equivalent name of a physical share. That is, using the referral information, one or more LIFs and the corresponding IP addresses can be identified for the target share comprising the target component.

At 432, the N-Module sends a response to the client with the one or more IP addresses, corresponding to the LIFs for accessing the target component locally from the remote node, for example. The client can then contact (e.g., a user may manually use the client to disconnect from the local node and reconnect to the remote node), or in another embodiment, be automatically (e.g., programmatically) connected to, the target using one of the IP addresses that connects through the remote node comprising the target component (e.g., using an Ethernet connection, and/or over the Internet). In this way, for example, the client can connect directly with the node where the target component is stored, thereby providing a more efficient path for performing operations (e.g., instead of having to perform operations across connections over the cluster fabric (e.g., 106 of FIG. 1) between the nodes, which may provide a slower retrieval of the data).

Figure 5:
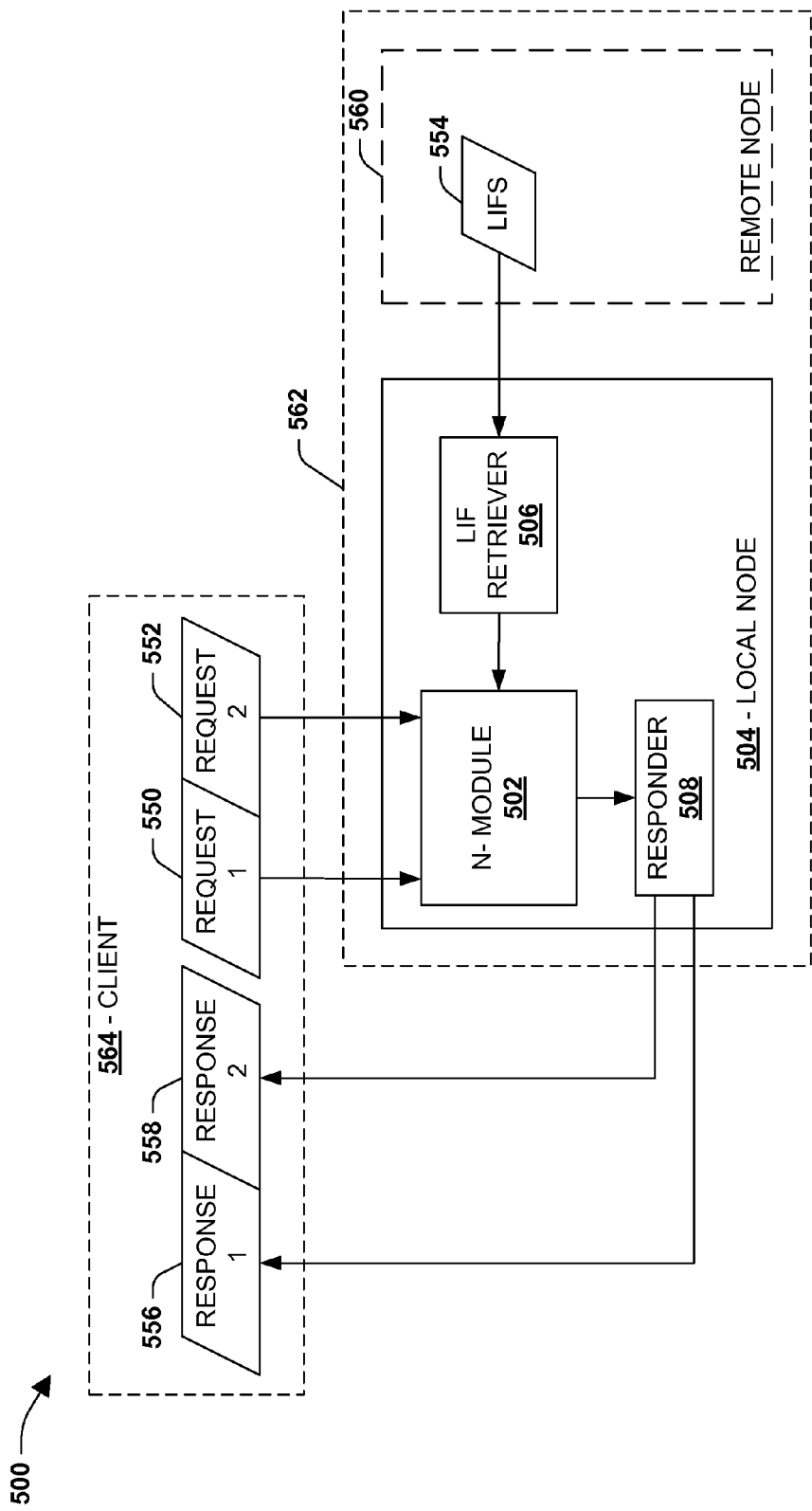
FIG. 5 is a component diagram illustrating an example system configured to handle a request to a remote target component in accordance with one or more of the provisions set forth herein.

A system can be devised that provides for efficient resource utilization and improved data response time, for example, by locating requested information in a multi-node distributed data storage system (cluster) using a structured directory, and providing a way for a client device to access the requested information as a local data request. FIG. 5 is a component diagram of an example system 500 for handling a request to a remote target component, such as data comprised in a file.

A network module 502 (n-module) is disposed in a local node 504 (e.g., 116, 118 of FIG. 1, or 202 of FIG. 2) of a distributed data storage network 562 (cluster). As described above (e.g., in FIG. 1), an n-module can be configured to allow clients to connect with nodes in a cluster, for example, to access data stored in the cluster. In this example system 500, the n-module 502 (e.g., 120, 122 of FIG. 1) is configured to receive requests, where a first request 550 comprises a target component stored on a remote node 560 in the distributed data storage network 562. For example, a client 564, which is connected locally to the local node 506, can send a request 550 for a write operation to a file (target component) that is located on a remote node (remote to the local node).

Further, a second request 552 to the n-module 502 comprises a distributed file system (DFS) referral request. That is, as described above, a DFS referral may be requested when a path to the target component is not covered by the local node 504. A logical interface (LIF) retrieval component 506 component is operably coupled with the network module 502. The LIF retrieval component 506 retrieves a list of one or more LIFs 554 on a remote node 560 in the distributed data storage system 562, on which the target component is stored.

In the example system 500, a response component 508 is operably coupled with the network module 502. The response component 508 responds to the first request 550 if one or more LIFs are retrieved by the LIF retriever 506, where the response 556 comprises an indication that a path to the target component is not covered by the local node 504. That is, as described above in FIGS. 3 and 4, if the LIF retrieval component identifies one or more LIFs, for example, that provide access to the target component by locally accessing the remote node, a first response 556 from the response component 508 informs the client 564 that the local node 504 does not cover (e.g., have access to) the target component. In this way, the client 564 may be forced to find another access point to the target component, for example.

Additionally, the response component 508 responds 558 to the second request 552 with one or more internet protocol (IP) addresses for accessing an efficient path to the target component. Here, the one or more IP addresses correspond to the one or more LIFs 554, retrieved by the LIF retriever 506, from a DFS namespace that comprises the target component. That is, for example, after the client 564 receives the first response 556 that indicates the local node 504 cannot access the target component, the client 564 can send a second request 552 for a DFS referral, and the response component 508 sends a list of IP addresses in a second response 558 to the client 564, from which the client can choose one to connect locally with the remote node 560 on which the target component is stored. In this way, the client 564, for example, has a more efficient route of access to the target component, as it connects directly (locally) to the remote node comprising the target component, such as by reducing a number of hops between nodes in the cluster.

Figure 6:
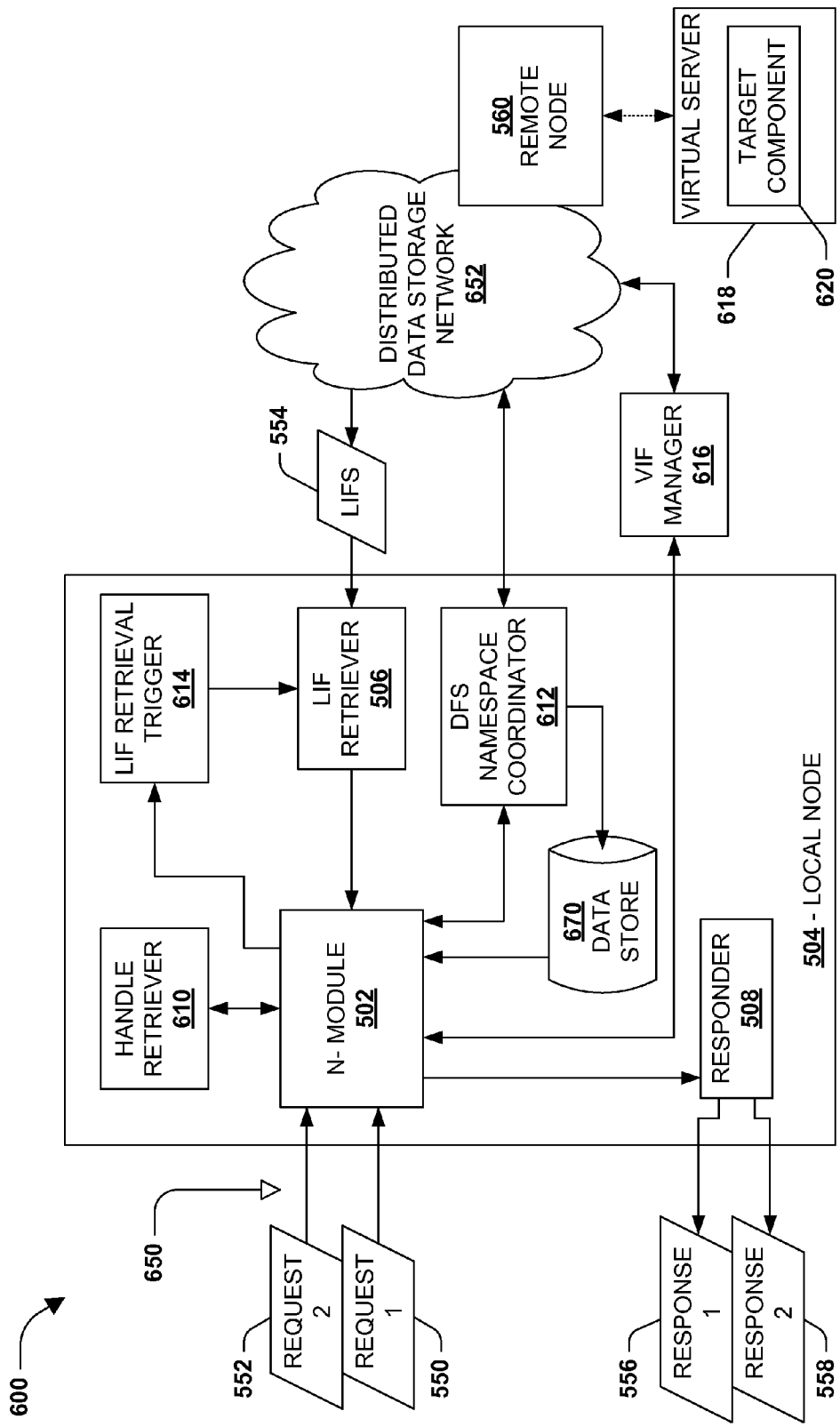
FIG. 6 is component block diagram illustrating one embodiment of a system configured to handle a request to a remote target component in accordance with one or more of the provisions set forth herein.

FIG. 6 is a component diagram of one embodiment 600 of an implementation of one or more of the systems described herein. In the embodiment 600 a handle retrieval component 610 is operably coupled with the network module 502 (e.g., 120, 122 of FIG. 1). The handle retrieval component 610 retrieves a handle from the first request 550 to the local node 504 (e.g., 116, 118 of FIG. 1), where the handle identifies the target component 618 on the remote node 560. As described above, a distributed data storage network 652 (cluster) (e.g., 102, 104 connected over a cluster fabric 106 of FIG. 1) can be configured to utilize handle identifiers for client requests, for example, where the handles inform the local node where the requested information resides in the cluster 652, such as locally or remotely. In this way, the handle retrieval component 610 can retrieve the handle from the request 550, which informs the n-module 502 whether the target component 620 is stored in the local node 504, or the remote node 560. In one embodiment, the handle comprises a particular descriptor that identifies the node location, such as a number or unique ID for the node, which can be compared against a list comprised in a local database (e.g., stored in local memory, such as 206 of FIG. 2).

In this example embodiment 600, a DFS namespace coordination component 612 is operably coupled with the n-module 502. The DFS namespace coordination component 612 identifies locations of common internet file system (CIFS) based components in the DFS namespace from identifiers associated with handles attached to requests (e.g., 550) to the distributed data storage network 652. For example, the remote node may comprise one or more virtual servers 618, which logically organize data from a plurality of physical locations (e.g., one or more physical servers). As described above, for example, the DFS namespace can provide a single location for accessing disparately stored files (e.g., files stored on separate physical machines).

In this embodiment 600, the a DFS namespace coordination component 612 can identify and manage DFS namespace locations of stored files (e.g., stored on volumes 132 of FIG. 1, and/or 230, 232 of FIG. 2), for example, and store the identified locations in an operably coupled data store 670, such as one disposed in the local node's memory, for retrieval by the network module 502. In this way, for example, the n-module 502 may be able to identify the target component location 620 in the cluster 652 from the handle retrieved by the handle retriever 610. Further, where the remote node 560 hosts a virtual server 618 that comprises the target component 620, the stored DFS namespace locations can help identify the virtual server 618.

A LIF retrieval triggering component 614 can determine that the target component 620 of the first request 550 is not a wide link, where the wide link is a DFS directory link for the namespace that redirects to another location in the namespace, as described above. As an example, the LIF retrieval triggering component 614 can examine the target location in the cluster, and if it is a wide link it will point to another directory instead of a data storage location. Further, the LIF retrieval triggering component 614 can determine that the first request 550 cannot be fulfilled from a local cache in the local node 504, such as by performing a quick search of the local cache directory for the requested data. Additionally, the LIF retrieval triggering component 614 can trigger the LIF retrieval component 506 if it is determined that the target component 620 is not a wide link and the first request cannot be fulfilled from a local cache. That is, for example, once the LIF retrieval component 506 determines that the target component is not stored in local cache and is not a wide link, it tells the LIF retrieval component 506 to retrieves LIFs for the request.

In one embodiment, the first request may comprise an indication that a DFS referral is active for the request. For example, requests made to the cluster 652 may comprise a bit that indicates whether the requester wishes to get a DFS referral if the target component cannot be accessed from the local node. In this example, the bit may have a zero if inactive, and a one if active for the request. In this way, in this embodiment, the n-module can respond (e.g., using the response component 508) with a list of DFS referrals (e.g., IP addresses associated with retrieved LIFs to access the target component 620 locally from the remote node 560).

In the example embodiment 600, a virtual interface (VIF) manager 616 is operably coupled with the network module, and it provides the list of one or more LIFs to the LIF retrieval component. That is, as described above, the VIF manager 616 can manage the LIFs for components, such as virtual servers, in the cluster 652. The n-module 502 can use the VIF manager 616 to retrieve LIFs, and therefore associated IP addresses, in order to respond (e.g., response 2, 558) to the client. As described above, one or more of the techniques and/or systems described herein are not limited to any particular location for the VIF manager 616. That is, for example, the VIF manager 616 may reside on the local node, such as in the n-module (e.g., 120, 122 of FIG. 1). Further, in this example, the VIM can be stored in memory on the local node (e.g., 206 of FIG. 2), and executed by a processor located in the local node (e.g., 204 of FIG. 2).

Figure 7:
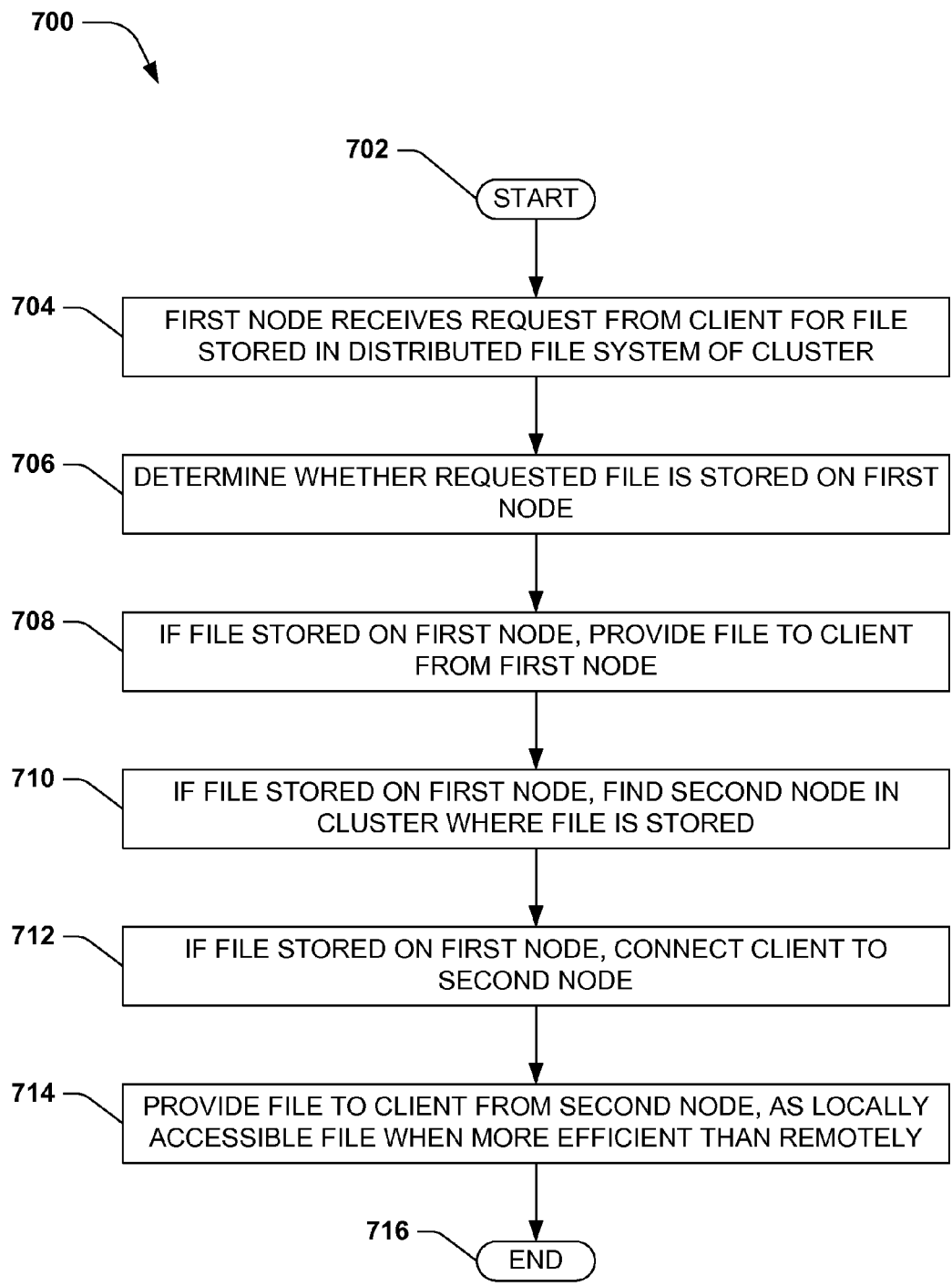
FIG. 7 is a flow diagram illustrating an example alternate method for handling a request to a remote target component in accordance with one or more of the provisions set forth herein.

An alternate method may be devised for handling a request to a remote target component, as in the flow diagram illustrating the exemplary method 700 of FIG. 7. The exemplary method 700 begins at 702 and involves receiving a request from a client device for a file, where the client device is connected to a first node of a cluster and the file is stored within a distributed file system of the cluster, and respective nodes of the cluster store portions of the distributed file system, at 704. That is, a client device may be connected to the first node in the cluster, and it sends a request to the first node, for example, for a file that is stored in the distribute file system on one of the nodes of the cluster.

At 706, it is determined, such as by the first node, whether the requested file is stored on the first node. That is, the file requested by the client, for example, may be stored locally on the first node. At 708, the file is provided to the client from the first node if it is stored on the first node. However, if the file is not stored on the first node, at 710, a second node is found, such as by the first node, on which is stored the requested file. That is, for example, because the distributed file system can store files on various nodes in the cluster, the first node can identify the node on which the file is located (e.g., by using a file ID handle associated with the file in the request, as described above).

At 712, if the file is not stored on the first node, the client device is connected to the second node. In one embodiment, the connecting of the client to the second node can be done automatically (e.g., programmatically). In another embodiment, the client can be redirected, such as by providing a link (e.g., IP address) for accessing the second node, and a user of the client can manually connect to the second node using the provided link.

At 714, the file is provided to the client from the second node, where the file is locally accessible to the client, regardless of which node the file is stored on. In this embodiment, accessing a file locally from a node to which the client device is connected is more efficient than accessing a file remotely from a node to which the client device is not connected. That is, for example, if the local node does not have local access to the requested file (e.g., it is not stored on the local node), it could access the file from the remote node over the cluster. However, accessing the file over the cluster may not be as efficient as accessing it from the remote node directly (e.g., by connecting locally to the remote node). Therefore, the client is connected to the remote node that comprises the file, for example, and is provided the file over that connection (e.g., a local connection to the remote node).

Having retrieved the requested file, the example method 700 ends at 716.

In one embodiment, connecting the client device to the second node can comprise providing an indication that the file is not located on the first node, for example, by returning an error response (e.g., "file not covered by this node") to the client request. Further, connecting the client device to the second node can comprise providing an indication that the file is located on the second node, for example, by providing an alternate access point to the client (e.g., an IP address for a LIF that connects to a virtual server comprising the requested file).

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 8:
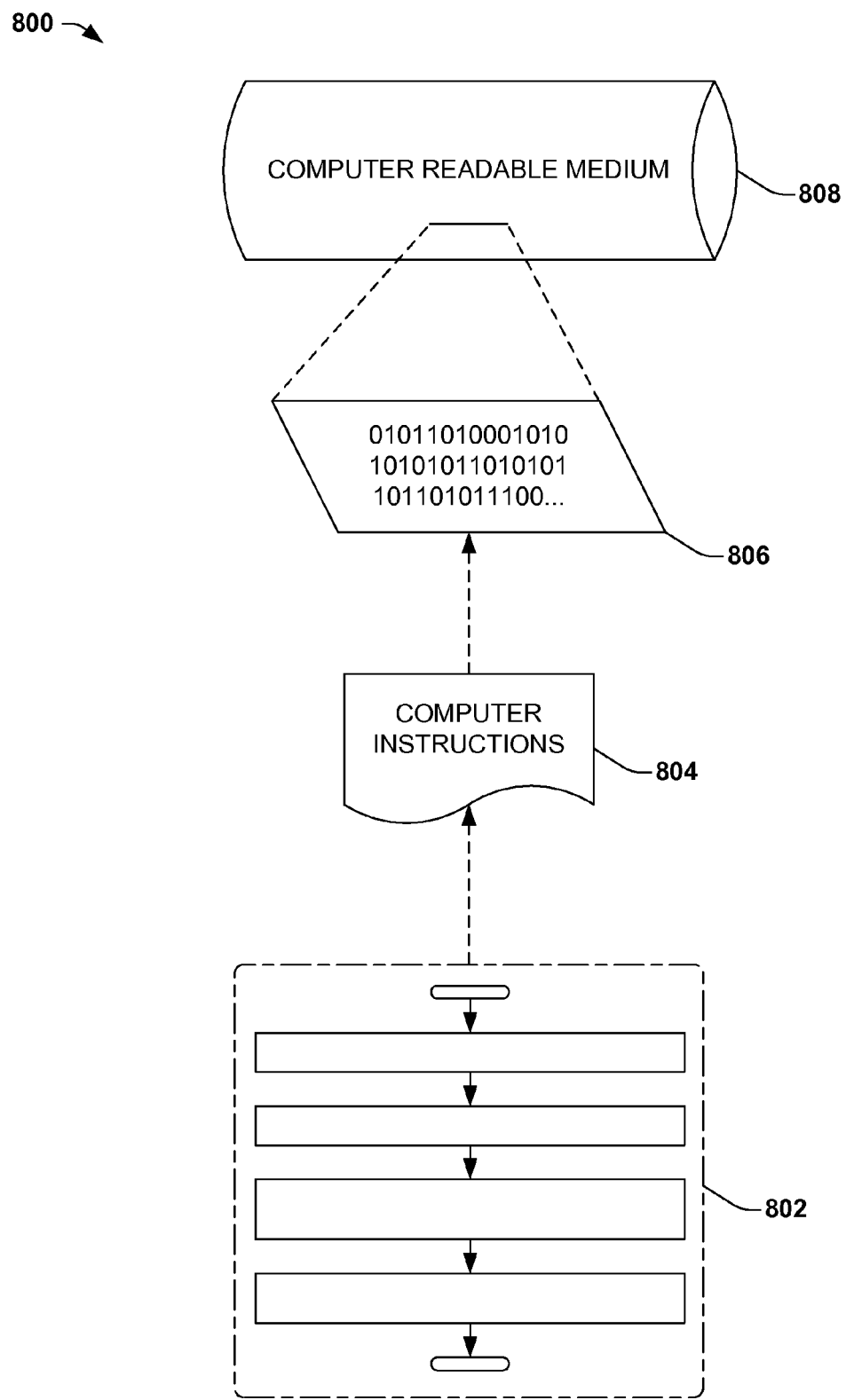
FIG. 8 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 8, where the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to the principles set forth herein. In one such embodiment, the processor-executable instructions 804 may be configured to perform a method 802, such as the method 300 of FIG. 3 or method 700 of FIG. 7, for example. Many such computer-readable media may be devised by those of ordinary skill in the art that are configured to operate in accordance with the techniques presented herein.

Moreover, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

What is claimed is:

1. A method for handling a request to a target component, comprising:
   in response to a request, received from a client by a local node of a distributed data storage network, for a target component:
      retrieving, by the local node, one or more logical interfaces (LIFs) for a remote node comprising the target component, the retrieving comprising consulting a virtual interface manager residing on a network (N) module of the local node, but not consulting the remote node, for a logical interface list comprising the one or more LIFs; and
   responsive to retrieving the one or more LIFs, the local node sending a response to the client, the response comprising:
      an indication that a path to the target component is not covered by the local node;
      one or more internet protocol (IP) addresses for accessing an efficient path to the target component, the one or more IP addresses corresponding to at least some of the retrieved one or more LIFs for the remote node; and
      an instruction for the client to locally connect to the remote node through the efficient path using at least one of the one or more IP addresses.

2. The method of claim 1, comprising:
   determining that the target component is not local to the local node.

3. The method of claim 2, the determining that the target component is not local comprising:
   determining that the target component is not a wide link.

4. The method of claim 1, the efficient path corresponding to a first network path from the client to the remote node that provides a faster data path than a second network path from the client through the local node to the remote node.

5. The method of claim 1, a logical interface within the logical interface list comprising a virtual network adapter for accessing a virtual server of the remote node that comprises the target component.

6. The method of claim 2, the determining that the target component is not local comprising:
   extracting a handle from the request that identifies a location of the target component on the remote node.

7. The method of claim 2, the determining that the target component is not local comprising:
   utilizing a distributed file system namespace to identify a location of the target component on the remote node based upon a distributed file system referral request from the client.

8. The method of claim 2, the determining that the target component is not local comprising:
   determining that the target component is not within a local cache of the local node.

9. The method of claim 7, the distributed file system referral request specifying that the client requests a distributed system referral if the target component is not local to the local node.

10. The method of claim 1, comprising:
    automatically connecting the client with the remote node using a direct local connection, the direct local connection not connecting the client to the remote node through the local node.

11. A system for handling a request for a target component, comprising:
    a data component of a local node within a distributed storage network configured to:
       in response to a request, received from a client by the local node, for a target component:
          retrieve a logical interface list of one or more logical interfaces (LIFs) for a remote node comprising the target component; and
       responsive to retrieving the logical interface list, send a response to the client, the response comprising:
          an indication that a path to the target component is not covered by the local node;
          one or more internet protocol (IP) addresses for accessing an efficient path to the target component, the one or more IP addresses corresponding to at least some of the one or more LIFs for the remote node; and an instruction for the client to directly connect to a controller of the remote node through the efficient path using at least one of the one or more IP addresses.

12. The system of claim 11, the data component configured to:
   determine that the target component is not local to the local node based upon a determination that the target component is not within a local cache.

13. The system of claim 11, the data component configured to:
   determine that the target component is not local to the local node based upon a determination that the target component is not a wide link.

14. The system of claim 11, the efficient path corresponding to a first network path from the client to the remote node that provides a faster data path than a second network path from the client through the local node to the remote node.

15. The system of claim 11, the data component configured to:
   utilize a distributed file system namespace to identify a location of the target component on the remote node based upon a distributed file system referral request from the client.

16. The system of claim 11, a logical interface within the logical interface list comprising a virtual network adapter for accessing a virtual server of the remote node that comprises the target component.

17. A computer-readable device comprising processor-executable instructions that when executed perform a method for handling a request for a target component, comprising:
   in response to receiving a first request and a second request for a target component, the first request received from a first client by a local node of a distributed data storage network, the second request received from a second client by the local node:
      retrieving, by the local node, a logical interface list of one or more logical interfaces (LIFs) for a remote node comprising the target component; and
      responsive to retrieving the logical interface list:
         the local node sending a first response to the first client, the first response comprising:
            a first indication that a path to the target component is not covered by the local node;
            a first internet protocol (IP) address for accessing a first efficient path to the target component, the first IP address corresponding to a first LIF for the remote node; and
            a first instruction for the first client to locally connect to the remote node through the first efficient path using the first IP address; and
         the local node sending a second response to the second client, the second response comprising:
            a second indication that the path to the target component is not covered by the local node;
            a second IP address for accessing a second efficient path to the target component, the second IP address corresponding to a second LIF for the remote node that is different than the first LIF; and
            a second instruction for the second client to locally connect to the remote node through the second efficient path using the second IP address.

18. The computer-readable device of claim 17, a logical interface within the logical interface list comprising a virtual network adapter for accessing a virtual server of the remote node that comprises the target component.

19. The computer-readable device of claim 17, the first efficient path corresponding to a first network path from the client to the remote node that provides a faster data path than a network path from the client through the local node to the remote node.

20. The computer-readable device of claim 17, the retrieving a logical interface list comprising:
   sending a request to a virtual interface manager for the logical interface list.

* * * * *